(12) United States Patent
Kim

(10) Patent No.: US 9,777,919 B2
(45) Date of Patent: Oct. 3, 2017

(54) COMBUSTION APPARATUS

(71) Applicant: KYUNGDONG NAVIEN CO., LTD., Pyeongtaek-si, Gyeonggi-do (KR)

(72) Inventor: Young Mo Kim, Gwangmyeong-si (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 211 days.

(21) Appl. No.: 14/648,253

(22) PCT Filed: Jan. 8, 2014

(86) PCT No.: PCT/KR2014/000176
§ 371 (c)(1),
(2) Date: May 28, 2015

(87) PCT Pub. No.: WO2014/115981
PCT Pub. Date: Jul. 31, 2014

(65) Prior Publication Data
US 2015/0316254 A1    Nov. 5, 2015

(30) Foreign Application Priority Data

Jan. 23, 2013  (KR) ......................... 10-2013-0007209

(51) Int. Cl.
*F23C 7/06* (2006.01)
*F23C 9/08* (2006.01)
(Continued)

(52) U.S. Cl.
CPC .................. *F23C 9/08* (2013.01); *F23C 7/06* (2013.01); *F23C 9/00* (2013.01); *F23D 14/02* (2013.01);
(Continued)

(58) Field of Classification Search
CPC ....................................................... F23C 9/08
(Continued)

(56) References Cited

U.S. PATENT DOCUMENTS 3,837,813 A * 9/1974 Ebeling ................... F23G 7/065
110/244
4,334,855 A * 6/1982 Nelson .................... F23N 1/065
126/116 A
(Continued)

FOREIGN PATENT DOCUMENTS

| EP | 1 959 194 A1 | 8/2008 |
|---|---|---|
| EP | 2 286 149 A2 | 2/2011 |

(Continued)

OTHER PUBLICATIONS

International Search Report dated Feb. 7, 2014, issued to the corresponding International Application No. PCT/KR2014/000176.

*Primary Examiner* — Avinash Savani
(74) *Attorney, Agent, or Firm* — Stein IP, LLC

(57) ABSTRACT

The present invention relates to a combustion apparatus capable of reducing the emission amount of nitrogen oxide and enabling stable combustion in the entire area of a set load. The combustion apparatus includes: a premixing chamber for premixing air and a gas; a blower for supplying a mixed-gas of the air and the gas to a burner; a combustion chamber for burning the mixed-gas by ignition of the burner; a heat exchanger for exchanging heat with water by using combustion heat in the combustion chamber; and an exhaust gas discharge part for discharging the exhaust gas passing through the heat exchanger, wherein the premixing chamber is formed in a Venturi shape having a throat part of which the cross-section area is tapered between an inlet and an outlet through which the air passes, the throat part of the premixing chamber being connected to a gas supply part for supplying a gas for combustion, and to an exhaust gas recirculation (Continued)

tube to which some of the exhaust gas having passed through the heat exchanger is introduced in proportion to differential pressure according to the flow rate of the mixed-gas passing through the throat part.

14 Claims, 11 Drawing Sheets

(51) Int. Cl.
*F23D 14/66* (2006.01)
*F23D 14/02* (2006.01)
*F23D 14/62* (2006.01)
*F23C 9/00* (2006.01)
*F23D 14/36* (2006.01)
*F24H 1/22* (2006.01)

(52) U.S. Cl.
CPC .............. *F23D 14/36* (2013.01); *F23D 14/62* (2013.01); *F23D 14/66* (2013.01); *F23C 2202/10* (2013.01); *F23C 2900/09002* (2013.01); *F23D 2203/007* (2013.01); *F23D 2206/00* (2013.01); *F23D 2209/00* (2013.01); *F23N 2021/12* (2013.01); *F24H 1/22* (2013.01)

(58) Field of Classification Search
USPC ...................................... 431/116, 20, 115, 19
See application file for complete search history.

(56) References Cited

U.S. PATENT DOCUMENTS

| | | | |
|---|---|---|---|
| 5,511,971 A | 4/1996 | Benz et al. | 431/9 |
| 6,039,560 A * | 3/2000 | Kubota | F23C 9/08 110/345 |
| 2011/0139045 A1 | 6/2011 | Zatti et al. | 110/188 |

FOREIGN PATENT DOCUMENTS

| | | |
|---|---|---|
| KR | 2001-0056546 A | 7/2001 |
| KR | 10-0805630 B1 | 2/2008 |
| KR | 10-0838163 B1 | 6/2008 |
| KR | 10-1204457 B1 | 11/2012 |

* cited by examiner

COMBUSTION APPARATUS

CROSS-REFERENCE TO RELATED APPLICATIONS

This application is a national stage of International Application No. PCT/KR2014/000176, filed Jan. 8, 2014, which claims the benefit of priority to Korean Application No. 10-2013-0007209, filed Jan. 23, 2013, in the Korean Intellectual Property Office, the disclosures of which are incorporated herein by reference.

TECHNICAL FIELD

The present invention relates to a combustion apparatus, more particularly, to a combustion apparatus in which a portion of an exhaust gas recirculates to an air intake side by using a differential pressure due to a venturi structure of the combustion apparatus to reduce a flame temperature, thereby reducing an emission amount of nitrogen oxide ($NO_x$), and also, the exhaust gas recirculates to the air intake side in proportional to supply amounts of fuel and air according to a set load to maintain a uniform air-fuel ratio over an entire load area from a high power load to a low power load, thereby stably performing combustion.

BACKGROUND ART

In general, combustion apparatuses are disposed in heating apparatuses in which water is heated by using combustion heat generated while fuel is burnt, and the heated water circulates along a tube to provide heating an indoor space or hot water.

Referring to FIG. 1, a general combustion apparatus according to a related art includes a blower 10 supplying air, a gas supply part 20 for supplying a combustion gas by adjustment of a valve 22 through a gas supply tube 21 connected to one side of the blower 10, a burner 20 for burning a mixed-gas in which the air is mixed with the gas, a combustion chamber 40 in which the mixed-gas is burnt by ignition of the burner 30, a heat exchanger 50 for heating water supplied through a heating water supply tube 62 after being introduced through a heating water return tube 61 to circulate in the combustion apparatus, by using the combustion heat of the combustion chamber 40, and a duct 70 through which an exhaust gas passing through the heat exchanger 50 is discharged.

In this combustion apparatus, a turn-down ratio (TDR) of the burner is set. The TDR represents 'a ratio of the minimum gas consumption to the maximum gas consumption' in a gas combustion apparatus in which the gas is variously adjusted in amount. For example, when the maximum gas consumption is 30,000 kcal/h, and the minimum gas consumption is 6,000 kcal/h, the TDR may be 5:1. The TDR may be limited according to whether how low the minimum gas consumption for maintaining stable flames can be adjusted.

The gas combustion apparatus gradually increases in convenience when using the heating and hot water as the TDR increases. That is, although the combustion is performed with the maximum flames in the beginning of the combustion in order to reach a desired heating temperature as soon as possible, when the combustion temperature reaches near the desired heating temperature, a gas amount supplied to the burner gradually decreases to perform the combustion. In this case, since the minimum gas consumption is high, if the TDR is low, it may be difficult to reduce and control the gas amount in order to reduce an output of the burner.

In particular, when the burner operates in an area where loads of the heating and hot water are low, the combustion apparatus may be frequently turned on and off to allow a combustion state to be unstable, thereby increasing deviation at the time of temperature control and deteriorating durability of the device. Thus, methods for improving the TDR of the burner applied to the combustion apparatus have been suggested.

As a prior art related to the methods for improving the TDR, there is a combustion apparatus of a gas boiler, the combustion apparatus including a blower for supplying air needed for combustion, a proportional control valve for adjusting a supply flow rate of a gas, a nozzle part connected to the proportional control valve to supply the gas by opening/closing of an auxiliary valve and in which a plurality of nozzles are parallelly connected to each other, a mixing chamber for mixing the air supplied from the blower with the gas passing through the nozzle part to supply the mixed-gas to a burner surface, and a control part for controlling RPM of the blower to supply a flow rate of the air only needed for the combustion according to opening/closing of the proportional control valve and the auxiliary valve, which is disclosed in Korean Patent Registration No. 10-0805630.

According to the above-described structure, the nozzle part to which the gas is supplied may be parallelly disposed in multi-stages, and opening/closing of each of the nozzle part may be controlled to correspond to an output of the burner, to improve the TDR, thereby increasing combustion stability on a low output area.

However, in the combustion apparatus according to the related art, the combustion gas such as nitrogen oxide ($NO_x$), carbon monoxide (CO), and so on, generated at a high flame temperature may be discharged as it is into the atmosphere through the duct via the heat exchanger. Thus, the combustion apparatus may be harmful to the environment and reduced in lifespan of components thereof.

DISCLOSURE OF THE INVENTION

Technical Problem

The present invention has been suggested in order to solve the above-described limitations, and an object of the present invention is to provide a combustion apparatus in which a portion of an exhaust gas recirculates to an air intake side by using a differential pressure due to a venturi structure to reduce a flame temperature, thereby reducing an emission amount of nitrogen oxide ($NO_x$).

Another object of the present invention is to provide a combustion apparatus in which a premixing ratio of fuel and air according to a set load is realized through a simple mechanical structure, and a recirculation structure of an exhaust gas is added to improve combustion efficiency of the combustion apparatus, and stable combustion is performed over an entire load area from a high power load to a low power load, and an environmental pollutant is reduced.

Technical Solution

A combustion apparatus according to the present invention to realize the above-described objects includes: a premixing chamber 200 in which air is mixed with a gas; a blower 140 for supplying the mixed-gas of the air and the gas to a burner; a combustion chamber 160 in which combustion is performed by ignition of the burner; a heat exchanger 170 in which water is heat-exchanged with combustion heat of the combustion chamber 160; and an exhaust gas discharge part 180 from which an exhaust gas passing through the heat exchanger 170 is discharged, wherein the premixing chamber 200 has a venturi shape having a throat part, which is gradually reduced in section area from an inlet and an outlet of the premixing chamber 200 to a central portion thereof, between the inlet and the outlet through which the air passes, and a gas supply part 230 supplying a combustion gas and an exhaust gas recirculation tube 400 are connected to the throat part of the premixing chamber 200 so that a portion of the exhaust gas passing through the heat exchanger 170 is introduced in proportional to a pressure difference according to a flow rate of the mixed-gas passing through the throat part.

In this case, the combustion apparatus may further include a mixed-gas adjusting part 300 opening and closing a flow passage of the air and the gas passing through the premixing chamber 200 to adjust a supply flow rate of the mixed-gas.

Also, the premixing chamber 200 may be divided into two sides, a first passage 210 and a second passage 220, by a partition member 201 therebetween, and the combustion gas introduced through the gas supply part 230 may be supplied to a first gas supply hole 231 connected to the first passage 210 and a second gas supply hole 232 connected to the second passage 220, and the exhaust gas recirculation tube 400 may be constituted by a first exhaust gas recirculation tube 401 connected to the throat part of the first passage 210 and a second exhaust gas recirculation tube 402 connected to the throat part of the second passage 220.

Also, a flow passage of the air and the gas of the first passage 210 may be in an opened state all the time, and the mixed-gas adjusting part 300 may open and close a flow passage of the air passing through the second passage 220 and a flow passage of the gas connected to the second passage 220 through the second gas supply hole 232.

Also, the first and second gas supply holes 231 and 232 may pass through one side surface of the first passage 210, and a first gas supply passage 231a extending from the first gas supply hole 231 to the partition member 201 across the first passage 210 and a second gas supply passage 232a passing through the partition member 201 from the second gas supply hole 232 across the first passage 210 to communicate with the second passage 220 may be defined in the throat part of the first passage 210, and a first gas jet hole 231b may be defined in the first gas supply passage 231a toward an outlet-side of the first passage 210, and a second gas connection hole 232b may be defined in an end of the second gas supply passage 232a passing through the partition member 201 toward the second passage 220.

Also, the mixed-gas adjusting part 300 may include: a first opening/closing member 320 for opening and closing the flow passage of the air passing through the second passage 220; and a second opening/closing member 330 for opening and closing the second gas connection hole 232b, wherein the first and second opening/closing members 320 and 330 may be lined to each other and simultaneously opened and closed.

Also, the first opening/closing member 320 may include: a main body 321 coupled to a rotation shaft 311a of a driving part 310 and transversally disposed on the throat part of the second passage 220; and blades 323 coupled to an outer surface of the main body 321 to face each other and have a size corresponding to that of an opened transversal section of the throat part of the second passage 220, wherein the second opening/closing member 330 may reciprocate in a transversal direction according to rotation of the first opening/closing member 320.

Also, on the main body (321) of the first opening/closing member 320, a first tip portion 322a protruding toward the second opening/closing member 330 and a first bottom portion 322b having an oppositely recessed shape with respect to the first tip portion 322a may be alternately disposed at an angle of 90° along a circumferential direction, and a first inclined portion 322c having a recessed shape may be disposed between the first tip portion 322a and the first bottom portion 322b, and a second tip portion 332a, a second bottom portion 332b, and a second inclined portion 332c each of which has a shape corresponding to that of each of the first tip portion 322a, the first bottom portion 322b, and the first inclined portion 322c may be disposed on the main body 331 of the second opening/closing member 330, and the second opening/closing member 330 may be elastically supported so that the second opening/closing member 330 is pressed toward the first opening/closing member 320 by an elastic member (350).

Also, a sealing member 340 for maintaining air-tightness when the second gas connection hole 232b may be sealed is coupled to the second opening/closing member 330.

Also, when the first tip portion 322a of the first opening/closing member 320 contacts the second tip portion 332a of the second opening/closing member 330, the blades 323 of the first opening/closing member 320 may be parallelly disposed with respect to a transversal section of the second passage 220 to block the flow of the air of the second passage 220, and at the same time, the second opening/closing member 330 is closely attached to the second gas connection hole 232b to block the flow of the gas passing through the second gas connection hole 232b, and when the first tip portion 322a of the first opening/closing member 320 contacts the second bottom portion 332b of the second opening/closing member 330, and the first bottom portion 322b of the first opening/closing member 320 contacts the second tip portion 332a of the second opening/closing member 330, the blades 323 of the first opening/closing member 320 may be vertically disposed with respect to the transversal section of the second passage 220 to open the second passage 220, and at the same time, the second opening/closing member 330 may be spaced apart from the second gas connection hole 232b to open the second gas connection hole 232b.

Also, a guide member 360 accommodating the second opening/closing member 330 and the elastic member 350 therein to guide a reciprocating motion of the second opening/closing member 330 may be disposed on the throat part of the second passage 220, and a second gas jet hole 364 may be defined in the guide member 360 toward an outlet-side of the second passage 220.

Also, protruding pieces 333 (333a, 333b) for supporting one end of the elastic member 350 may be disposed in plurality on an edge of the main body 331 of the second opening/closing member 330 along a circumferential direction, and a flange part 362 for supporting the other end of the elastic member 350 and that is closely attached on a circumferential surface of the second gas connection hole 232b may be disposed in the guide member 360.

Also, a plurality of guide grooves 363 (363a, 363b) for guiding the plurality of protruding pieces 333 (333a, 333b) to move in a horizontal direction may be defined in an inner surface of the guide member 360 in longitudinal direction.

Also, fixing projections 362a and 362b and fixing grooves that are fitted and coupled to each other may be respectively formed on the flange part 362 of the guide member 360 and the circumferential surface of the second gas connection hole 232b to fix the guide member 360.

Also, the premixing chamber 200 may have a venturi shape having a single passage.

ADVANTAGEOUS EFFECTS

In the combustion apparatus according to the present invention, since a portion of the exhaust gas recirculates to the air intake side in proportional to the heat source supplied according to the differential pressure due to the venturi structure, the components of the exhaust gas recirculation device may be mechanically simplified. Also, the combustion temperature may be reduced by the recirculation of the exhaust gas to reduce the emission amount of nitrogen oxide ($NO_x$), thereby providing an eco-friendly combustion apparatus and improving durability of the components.

Also, since the supply flow rates of the fuel, the air, and the recirculation exhaust gas are simultaneously proportionally controlled according to the set load, the combustion apparatus may be improved in combustion efficiency, and the combustion system that is stable over an entire load area from the high power load to the low power load may be realized.

DESCRIPTIONS OF REFERENCE NUMERALS IN THE ACCOMPANYING DRAWINGS

Figure 1:
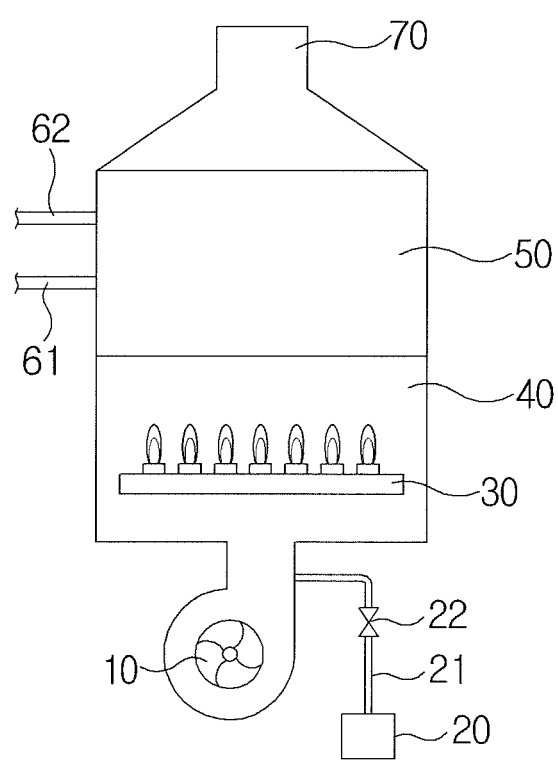
FIG. 1 is a schematic view of a combustion apparatus according to the related art.

10: Blower   20: Gas supply part
20: Gas supply tube   22: Valve
30: Burner   40: Combustion chamber
50: Heat exchanger   61: Heating water return tube
62: Heating water supply tube   70: Duct
110: Air intake hole   120: Air intake preheating part
130: Air supply tube   140: Blower
150: Mixed-gas supply tube   160: Combustion chamber
170: Heat exchanger   180: Exhaust gas discharge part
190: Duct   200: Premixing chamber
201: Partition member   210: First passage
211: First premixing chamber   220: Second passage
221: Second premixing chamber   230: Gas supply part
231: First gas supply hole   231a: First gas supply passage
231b: First gas jet hole   232: Second gas supply hole
232a: Second gas supply passage   232b: Second gas connection hole
300: Mixed-gas adjusting part   310: Driving part
311: Motor   311a: Rotation shaft
312: Bracket   320: First opening/closing member
321: Main body   321a: Rotation shaft coupling groove
322: First cam-shaped part   322a: First tip portion
322b: First bottom portion   322c: First inclined portion
323: Blade   330: Second opening/closing member
331: Main body   332: Second cam-shaped part
332a: Second tip portion   332b: Second bottom portion
332c: Second inclined portion   333: Protruding piece
340: Sealing member   350: Elastic member
360: Guide member   361: Main body
362: Flange part   362a, 362b: Fixing projections
363: Guide groove   364: Second gas jet hole
400: Exhaust gas recirculation tube   401: First exhaust gas recirculation tube
402: Second exhaust gas recirculation tube

MODE FOR CARRYING OUT THE INVENTION

Hereinafter, components and effects of a combustion apparatus according to preferred embodiments of the present invention will be described in detail with reference to the accompanying drawings.

Figure 2:
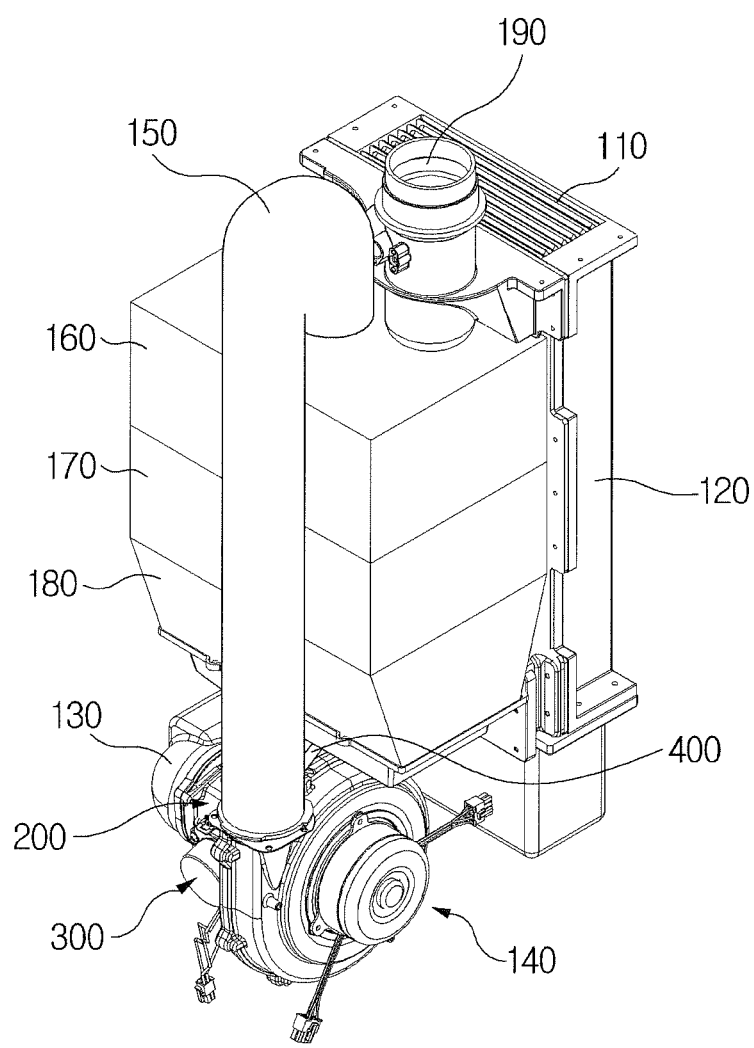
FIG. 2 is a perspective view of a combustion apparatus according to an embodiment of the present invention.

Referring to FIG. 2, the combustion apparatus according to an embodiment of the present invention includes an air intake hole 110 to which external air is introduced, an air preheating part 120 defining a supply channel of the air introduced through the air intake hole 110 and at the same time defining an exhaust channel of an exhaust gas, which is separated from the supply channel of the air; an air supply tube 130 through which the air passing through the air preheating part 120 moves a premixing chamber 200 in which the air introduced through the air supply tube 130, a combustion gas, and a recirculated exhaust gas are premixed a mixed-gas adjusting part 300 adjusting a section area of a passage through which the air and the gas flow in the premixing chamber 200 to adjust a supply flow rate of the mixed-gas, a blower 140 transferring the mixed-gas to a burner, a combustion chamber 160 in which the mixed-gas supplied thorough the supply tube 150 by being transferred from the blower 140 is burnt by ignition of the burner, a heat exchanger 170 heating water circulating therein by using combustion heat generated from the combustion chamber 160, an exhaust gas discharge part 180 through which the exhaust gas that is heat-exchanged in the heat exchanger 170 passes, a duct 190 from which the exhaust gas that is heat-exchanged with the air while passing through the air preheating part 120 is discharged, and an exhaust gas recirculation tube 400 to which a portion of the exhaust gas passing through the exhaust gas discharge part 180 recirculates to be introduced into the premixing chamber 200.

Figure 3:
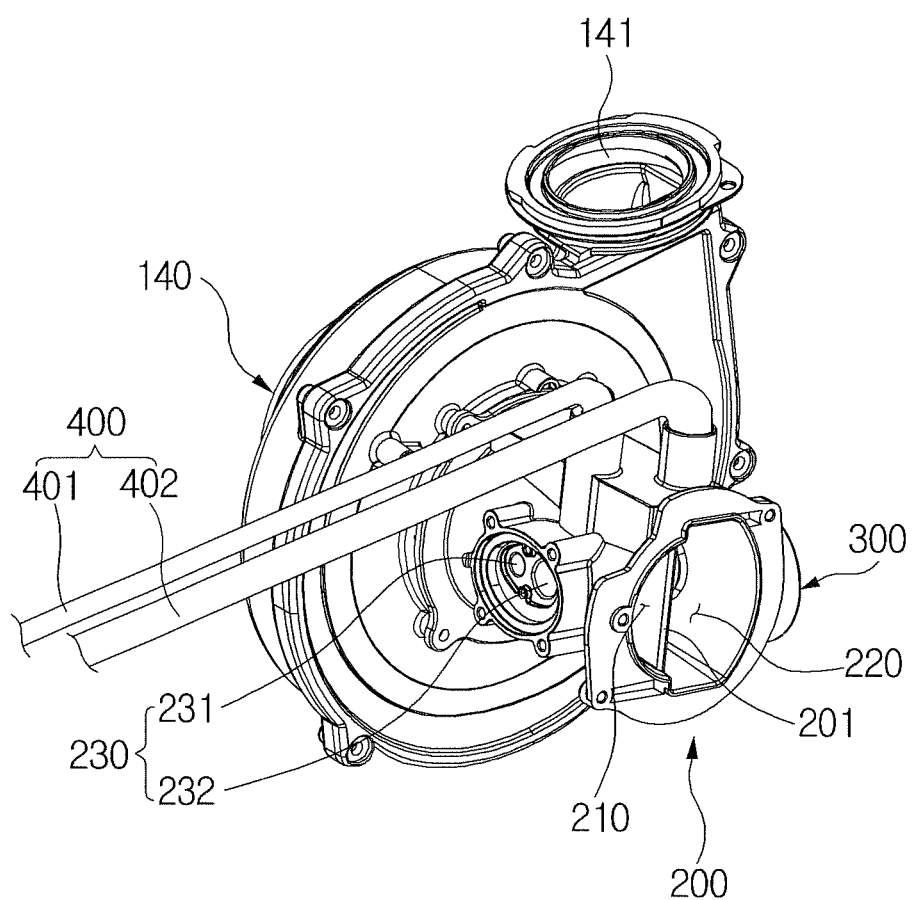
FIG. 3 is an enlarged perspective view of a premixing chamber and a blower of FIG. 2.

Referring to FIG. 3, the premixing chamber 200 is connected to an inlet-side of the blower 140. An inner space of the premixing chamber 200 is divided into a first passage 210 and a second passage 220 by a partition member 201 therebetween. The premixing chamber 200 has a venturi shape having a throat part, which is gradually reduced in section area from an inlet and an outlet toward the center thereof, in a central portion between the inlet to which the air is introduced and the outlet from which the mixed-gas is discharged toward the blower 140. That is, the premixing chamber 200 has a shape in which each of the inlet and the outlet of the air has a relatively wide section area, and the premixing chamber 200 gradually decreases in section area from the inlet and the outlet toward the throat part of the center thereof.

A gas supply part 230 connected to a combustion gas supply tube (not shown) is disposed on one side of the throat part of the premixing chamber 200. Also, a mixed-gas adjusting part 300 is disposed on the other side of the throat part. A first exhaust gas recirculation tube 401 is connected to the throat part of the first passage 210, and a second exhaust gas recirculation tube 402 is connected to a front side of the throat part of the second passage 220.

A first gas supply hole 231 connected to the first passage 210 and a second gas supply hole 232 connected to the second passage 220 are defined in the gas supply part 230.

The first passage 210 of the premixing chamber 200 has a flow passage of the air and the gas that is in an opened state all the time. Also, a flow passage of the air and the gas of the second passage 220 is opened when a combustion load is more than a set load and is closed when the combustion load is less than the set load, by an operation of the mixed-gas adjusting part 300.

The exhaust gas recirculation tubes 400 (401, 402) defines a flow passage through which a portion of the heat-exchanged exhaust gas recirculates to be introduced into the premixing chamber 200. An inlet of the exhaust gas recirculation tube 400 may pass through the heat exchanger 170 and disposed on a predetermined position between the exhaust gas discharge part 180 and the duct 190.

The mixed-gas of the air, the combustion gas, and the recirculated exhaust gas premixed with each other in the premixing chamber 200 may be suctioned into the blower 140 by rotation of a fan disposed in the blower 140 and then be supplied to the mixed-gas supply tube 150 through a mixed-gas discharge hole 141.

Like this, according to the premixing chamber 200 having a venturi shape and the structure in which the gas supply parts 230 (231, 232) and the exhaust gas recirculation tube 400 (401, 402) are connected to the one side of the throat part, the air passing through the throat part has a flow rate that is relatively higher than that of the air at each of the inlet and outlet of the premixing chamber 200 and a pressure that is lower than that of each of the inlet and outlet of the premixing chamber 200, and thus a differential pressure may occur between the inlet and outlet of the premixing chamber 200 and the throat part. Also, when the air is adjusted in flow rate by controlling RPM of the blower 140, the gas and the exhaust gas introduced into the throat part having a relatively low pressure due to the differential pressure are also proportionally controlled in flow rate so that the flow rate is maintained in a predetermined air-fuel ratio.

Figure 4:
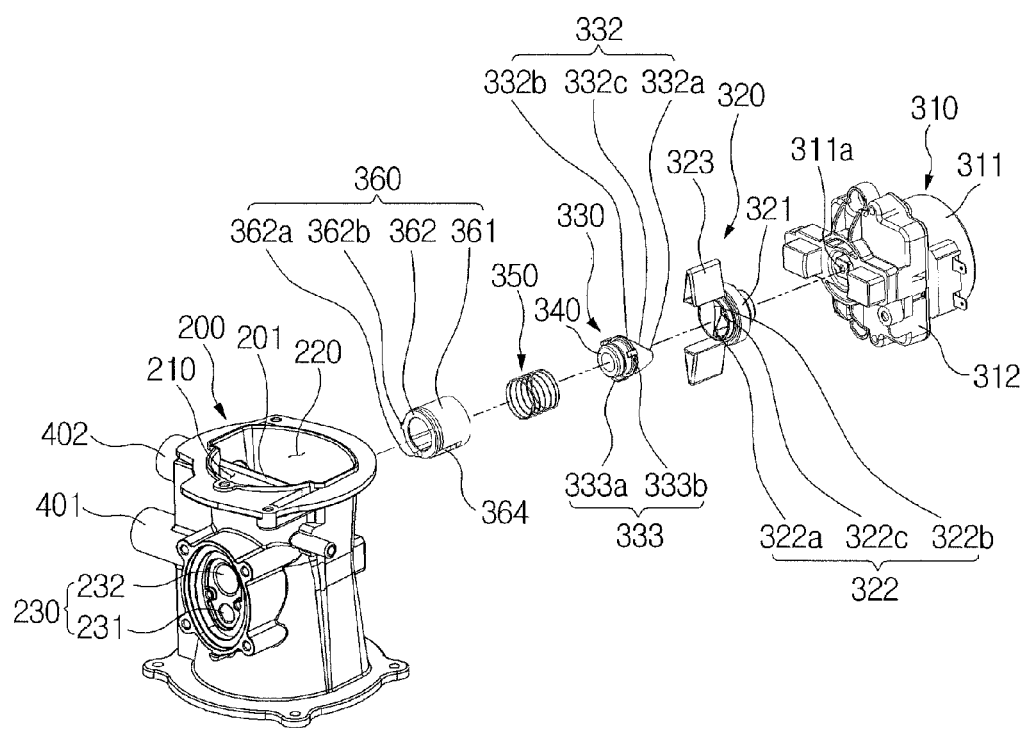
FIGS. 4 and 5 are an exploded perspective view of the premixing chamber and a mixed-gas adjusting part.
Figure 5:
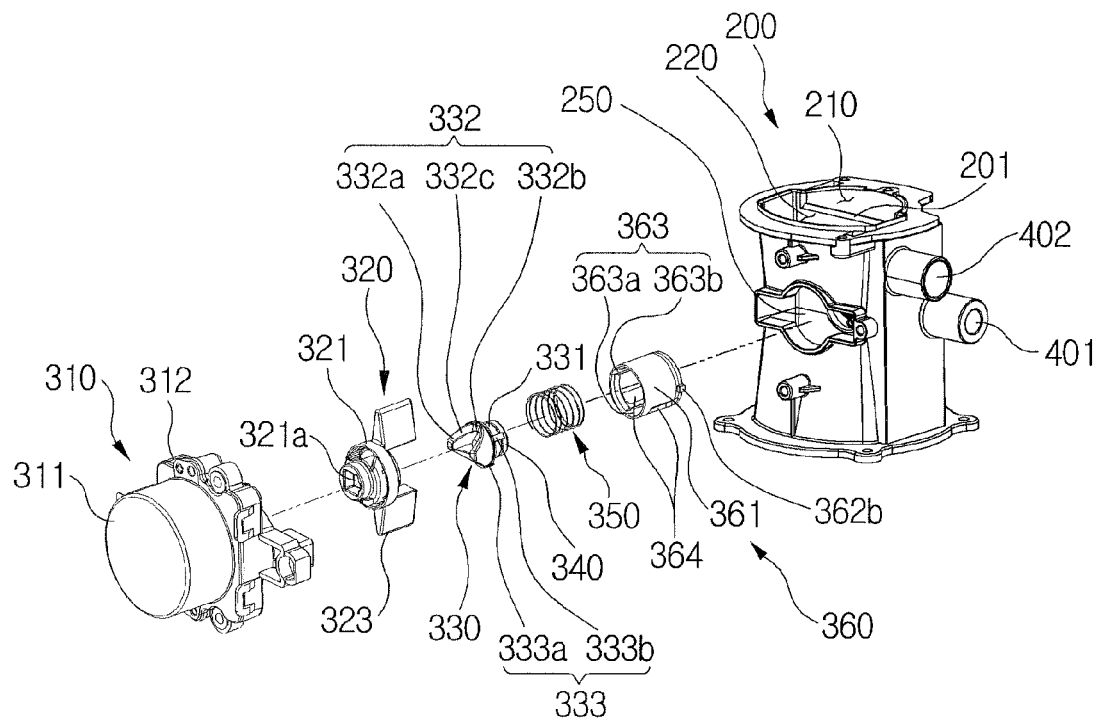
Figure 6:
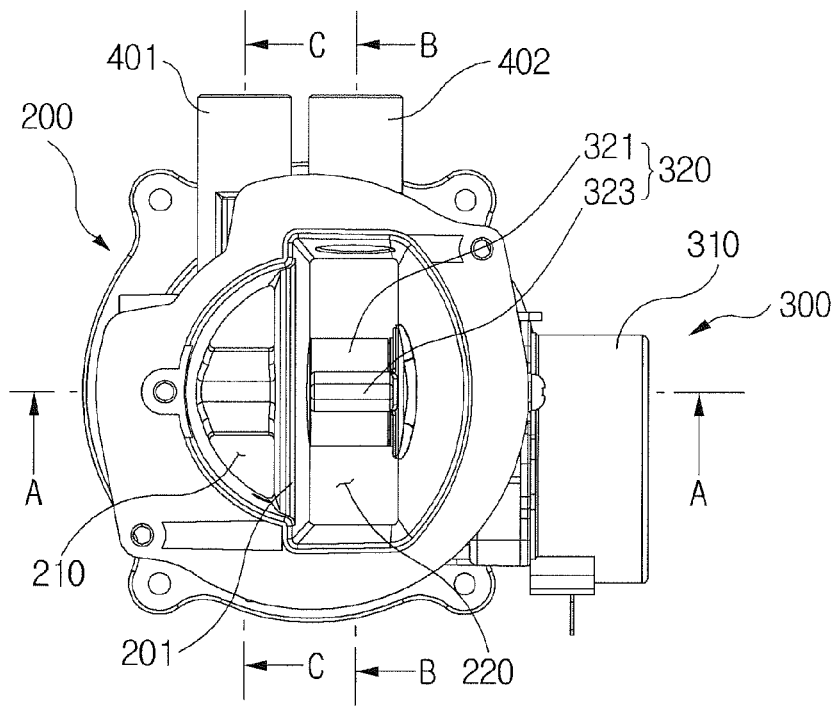
FIG. 6 is a plane view of the premixing chamber at a high power load.

Hereinafter, components of the premixing chamber 200 and the mixed-gas adjusting part 300 and coupling relationship between the premixing chamber 200 and the mixed-gas adjusting part 300 will be described in detail with reference to FIGS. 4, 5, and 7.

Figure 7:
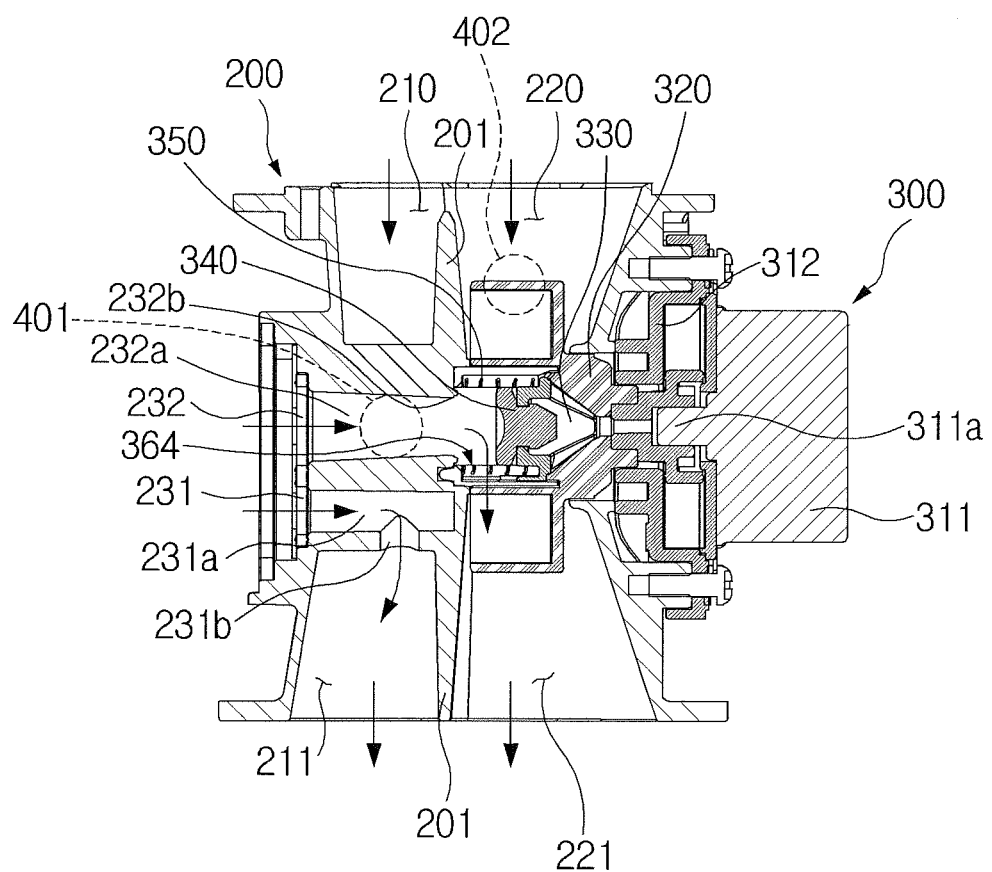
FIG. 7 is a cross-sectional view taken along line A-A of FIG. 6.
Figure 8:
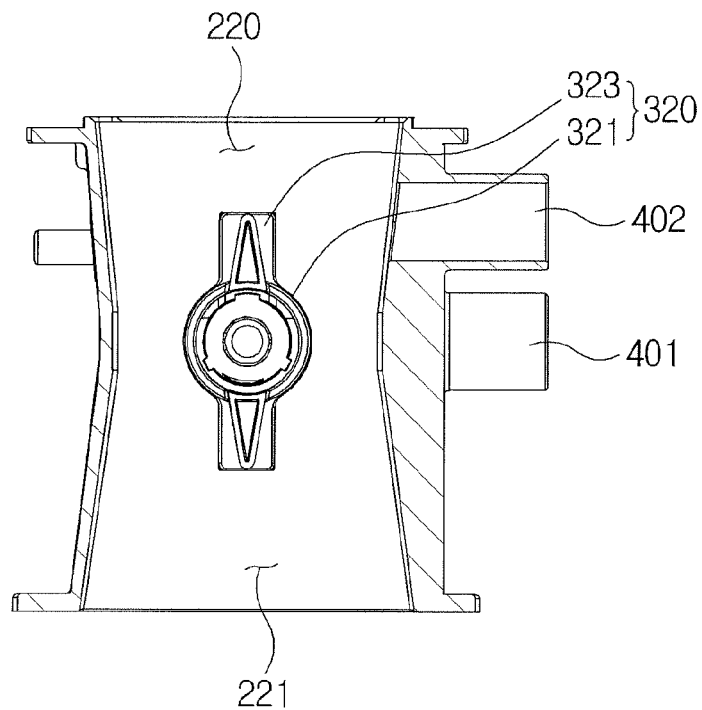
FIG. 8 is a cross-sectional view taken along line B-B of FIG. 6.
Figure 9:
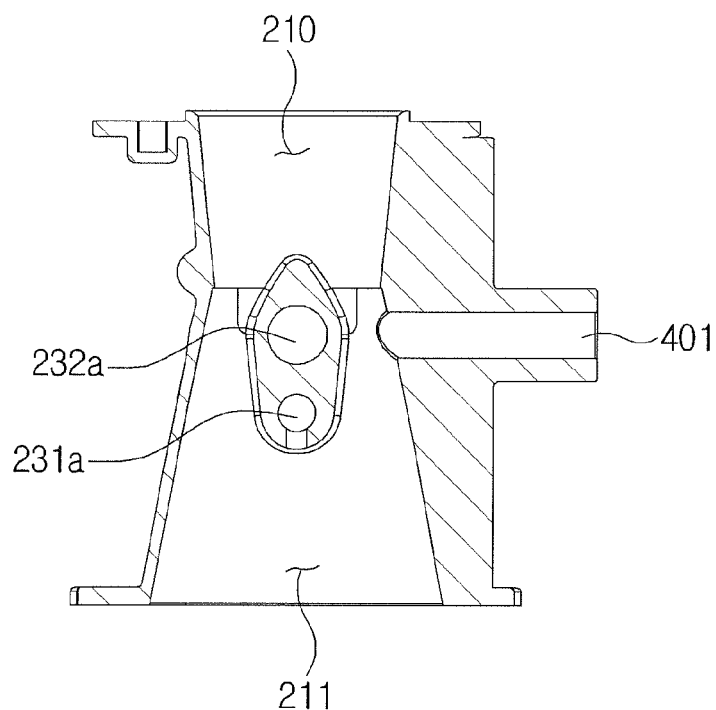
FIG. 9 is a cross-sectional view taken along line C-C of FIG. 6.

First, referring to FIG. 7, in the premixing chamber 200, the first and second passages 210 and 220 partitioned into two sides in the premixing chamber 200 by the partition member 201 are defined, and the throat part having a relatively narrow section area when compared to the inlet and the outlet of the premixing chamber 200 is defined in each of a central portion of the first passage 210 and a central portion of the second passage 220. A first gas supply hole 231 and a second gas supply hole 232 spaced upward from the first gas supply hole 231 are defined in one side surface of the throat part of the first passage 210.

A first gas supply passage 231a is defined from the first gas supply hole 231 to the partition member 201 across the first passage 210. A first gas jet hole 231b is defined in the first gas supply passage 231a toward an outlet-side of the first passage 210.

A second gas supply passage 232a is defined from the second gas supply hole 232 to pass through the partition member 201 across the first passage 210 to communicate with the second passage 220. A second gas connection hole 232b is defined on an end of the second gas supply passage 232a passing through the partition member 201 toward the second passage 220.

The first and second gas supply passages 231a and 232a are parallelly disposed to be vertically spaced apart from each other. A flow passage of the air is defined in a space between an inner wall of the first passage 210 and the first and second gas supply passages 231a and 232a. In the first passage 210, each of the flow passage of the air and the flow passage of the gas are in opened state all the time.

The mixed-gas adjusting part 300 includes a first opening/closing member 320 for opening and closing the flow passage of the air passing through the second passage 220 and a second opening/closing member 330 for opening and closing the second gas connection hole 232b. Here, the first and second opening/closing members 320 and 330 are linked to each other and opened and closed at the same time.

The first opening/closing member 320 includes a main body 321 coupled to a rotation shaft 311a of a driving part 310 and transversally disposed in the throat part of the second passage 220 and blades 323 coupled to an outer surface of the main body 321 in a distance at an angle of 180°. The blades 323 have a size corresponding to that of an opened transversal section of the throat part of the second passage 220. Thus, when the blade 323 is disposed in parallel to the transversal section of the throat part in a transversal direction, the flow passage of the air of the second passage 220 may be blocked. Also, when the blade 323 is vertically disposed to stand upright with respect to the transversal section of the throat part, the flow passage of the air is opened through a space spaced apart form an inner side surface of the second passage 220.

The driving part 310 includes a motor 311 and a bracket 312 inserted and coupled to a coupling hole 250 defined in one side surface of the premixing chamber 200 in order to fix the motor 311 to the one side of the premixing chamber 200 by passing the rotation shaft 311 therethrough. The rotation shaft 311a is fitted and coupled to a rotation shaft coupling groove 321a defined in the main body 321 of the first opening/closing member 320 to allow the first opening/closing member 320 to rotate when the motor 311 is driven.

The second opening/closing member 330 is linked to rotation of the first opening/closing member 320 to reciprocate in a transversal direction to open and close the second gas connection hole 232b of the second gas supply hole 232. Also, a sealing member 340 for maintaining air-tightness when the second gas connection hole 232b is sealed is disposed on the second opening/closing member 330.

A first cam-shaped part 322 in which a first tip portion 322a protruding toward the second opening/closing member 330 and a first bottom portion 322b oppositely recessed with respect to the first tip portion 322a are alternately disposed at an angle of 90° along a circumferential direction, and a first inclined portion 322c having a concave shape is disposed between the first tip portion 322a and the first bottom portion 322b is disposed on the main body 321 of the first opening/closing member 320.

A second cam-shaped part 332 having a second tip portion 322a, a second bottom portion 332b, and a second inclined portion 332c each of which has a shape corresponding to that of each of the first tip portion 322a, the first bottom portion 322b, and the first inclined portion 322c is disposed on the main body 331 of the second opening/closing member 330. Also, the second opening/closing member 330 is elastically supported so that the second opening/closing member 330 is pressed toward the first opening/closing member 320 by an elastic member 350. The second opening/closing member 330 may reciprocate toward the second gas connection hole 232b or in a direction far away from the second gas connection hole 232b according to positions of the first and second cam-shaped parts 322 and 332 when the first opening/closing member 320.

Also, a guide member 360 accommodating the second opening/closing member 330 and the elastic member 350 therein to guide a reciprocating motion of the second opening/closing member 330 is disposed on the throat part of the second passage 220. A second gas jet hole 364 is defined in the guide member 360 toward and outlet-side of the second passage 220.

Protruding pieces 333 (333a, 333b) for supporting one end of the elastic member 350 are disposed on an edge of the main body 331 of the second opening/closing member 330 along a circumferential direction. A flange part 362 supporting the other end of the elastic member 350 and closely attached to a circumferential surface of the second gas connection hole 232b is disposed in the guide member 360.

Also, a plurality of guide grooves 363 (363a, 363b) for guiding the plurality of protruding pieces 333 (333a, 333b) to reciprocate in a horizontal direction are defined in an inner surface of the guide member 360 along a longitudinal direction. Fixing projections 362a and 362b and fixing grooves (not shown) that are fitted and coupled to each other are respectively formed on the flange part 362 of the guide member 360 and the circumferential surface of the second gas connection hole 232b. Thus, the guide member 360 is fixed to the partition member 201 at a correct position.

Hereinafter, effects of the present invention will be described.

Referring to FIGS. 6 to 9, when the set load is in a high power state, the blade 323 of the first opening/closing member 320 is vertically disposed to stand upright with respect to the transversal section of the second passage 220 to open the flow passage of the air passing through the second passage 220 and simultaneously to cause a phase difference between the first and second tip portions 322a and 332a at an angle of 90°. Here, the first tip portion 322a of the first opening/closing member 320 contact the second bottom portion 332b of the second opening/closing member 330, and at the same time, the first bottom portion 322b of the first opening/closing member 320 contact the second tip portion 332a of the second opening/closing member 330. Also, the second opening/closing member 330 move in a direction far away from the second gas connection hole 232b by an elastic force of the elastic member 350 to open the second gas connection hole 232b. Thus, the air, the gas, and the recirculated exhaust gas may be introduced through the second passage 330 as well as the first passage 320 and mixed with each other.

In this case, when the air is introduced through the first passage 210 to pass through the throat part of the first passage 210, the combustion gas that is introduced through the first gas supply hole 231 due to the differential pressure generated in the throat part passes through the first gas supply passage 231a and is jetted to the first premixing chamber 211 through the first gas jet hole 231b and simultaneously mixed with a portion of the exhaust gas introduced through the first exhaust gas recirculation tube 401 and then is discharged through the outlet of the first passage 210. At the same time, when the air is introduced through the second passage 220 to pass through the throat part of the second passage 220, the combustion gas that is introduced through the second gas supply hole 232 due to the differential pressure generated in the throat part is jetted to the second premixing chamber 221 through the second gas supply passage 232a, the second gas connection hole 232b, and the second gas jet hole 364 and simultaneously mixed with a portion of the exhaust gas introduced through the second exhaust gas recirculation tube 402 and is discharged through the outlet of the second passage 220.

Figure 10:
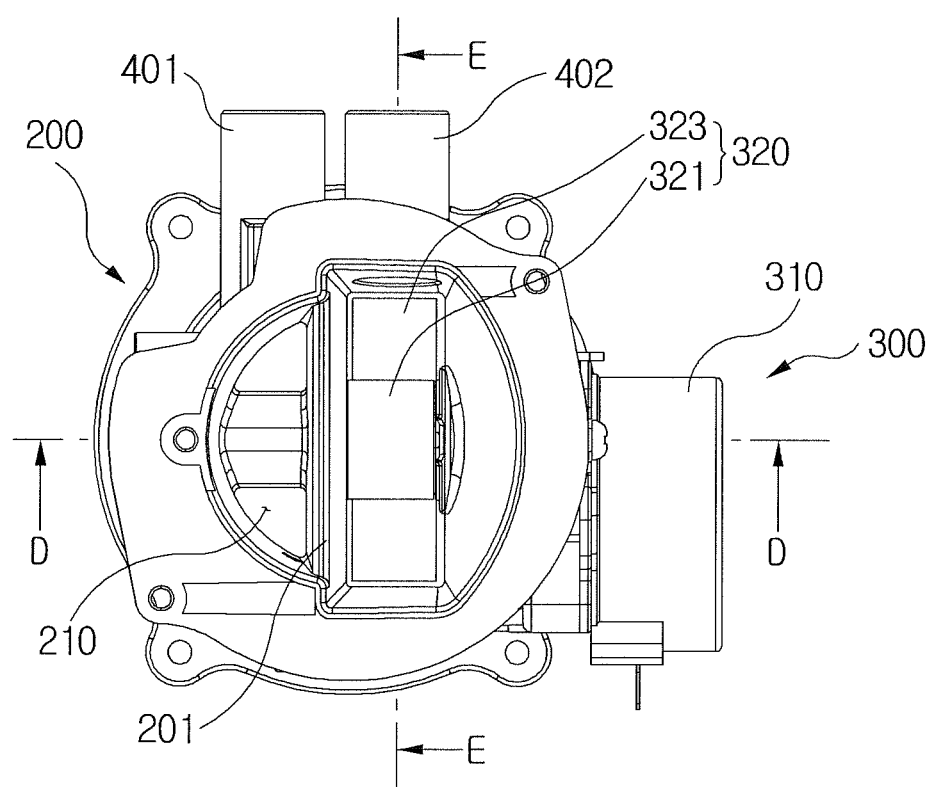
FIG. 10 is a plane view of the premixing chamber at a low power load.
Figure 11:
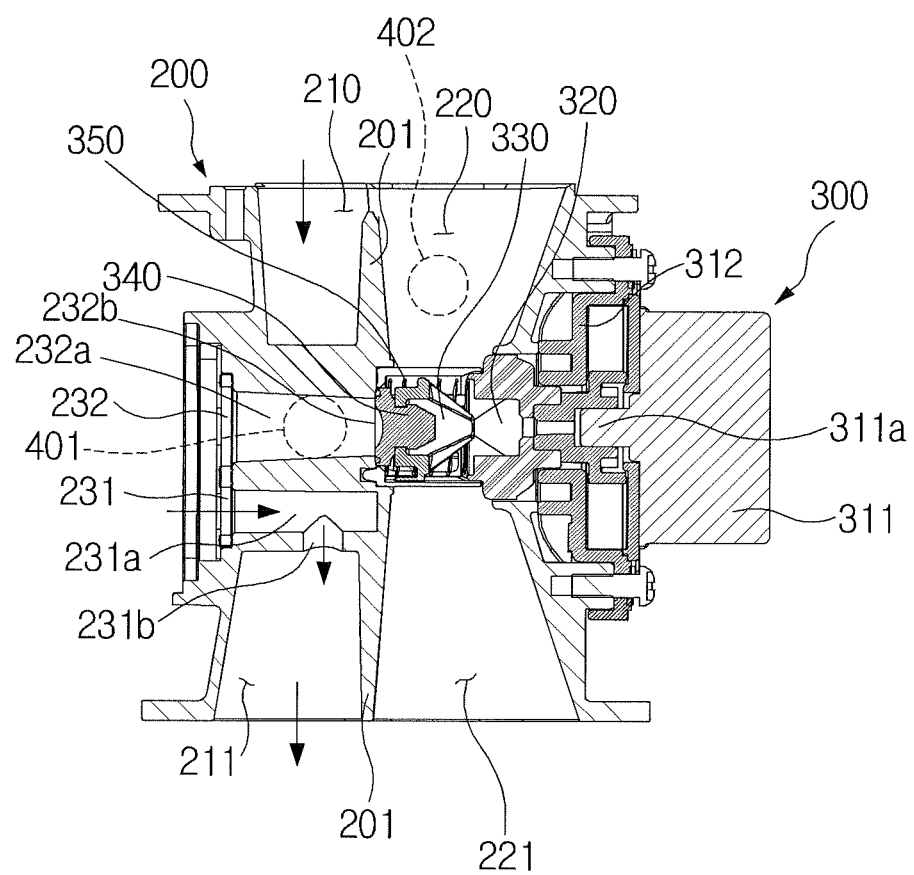
FIG. 11 is a cross-sectional view taken along line D-D of FIG. 10.
Figure 12:
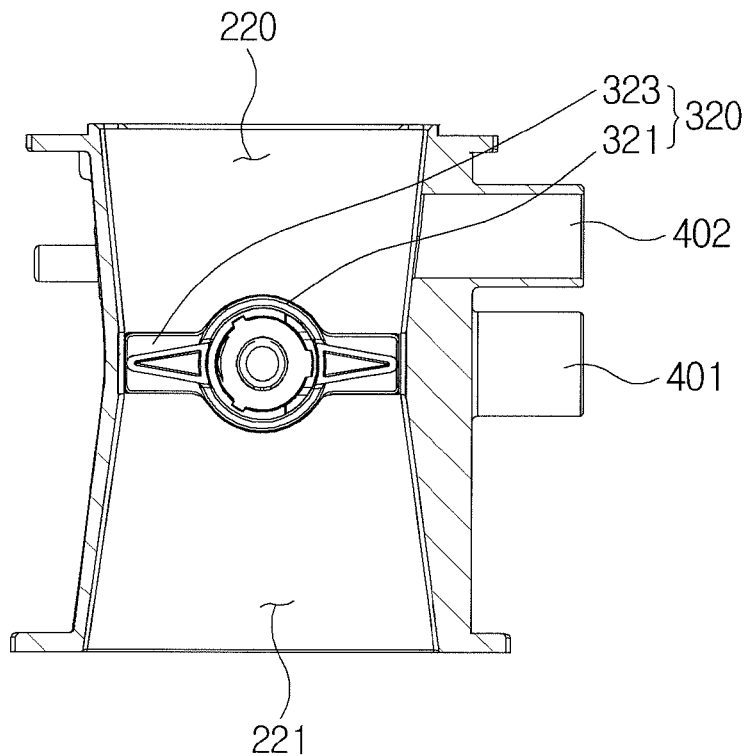
FIG. 12 is a cross-sectional view of E-E of FIG. 10.

Referring to FIGS. 10 to 12, when the set load is in a low power state, the blade 323 of the first opening/closing member 320 is horizontally disposed in a transversal-section direction of the second passage 220 to block the flow of the air through the second passage 220, and at the same time, the first tip portion 322a of the first opening/closing member 320 contact the second tip portion 332a of the second opening/closing member 330 at the same phase. Here, the second opening/closing member 330 moves toward the second gas connection hole 232b regardless of the elastic force of the elastic member 350 to block the second gas connection hole 232b by the sealing member 340 coupled to the second opening/closing member 330.

Thus, the air, the gas, and the recirculated exhaust gas may be supplied only through the first passage 320, and the supply of the air, the gas, and the exhaust gas through the second passage 330 may be blocked. In this case, when the air is introduced through the first passage 210 to pass through the throat part of the first passage 210, the combustion gas that is introduced through the first gas supply hole 231 due to the differential pressure generated in the throat part passes through the first gas supply passage 231a and is jetted to the first premixing chamber 211 through the first gas jet hole 231b and simultaneously mixed with a portion of the exhaust gas introduced through the first exhaust gas recirculation tube 401 and is discharged through the outlet of the first passage 210.

Figure 13:
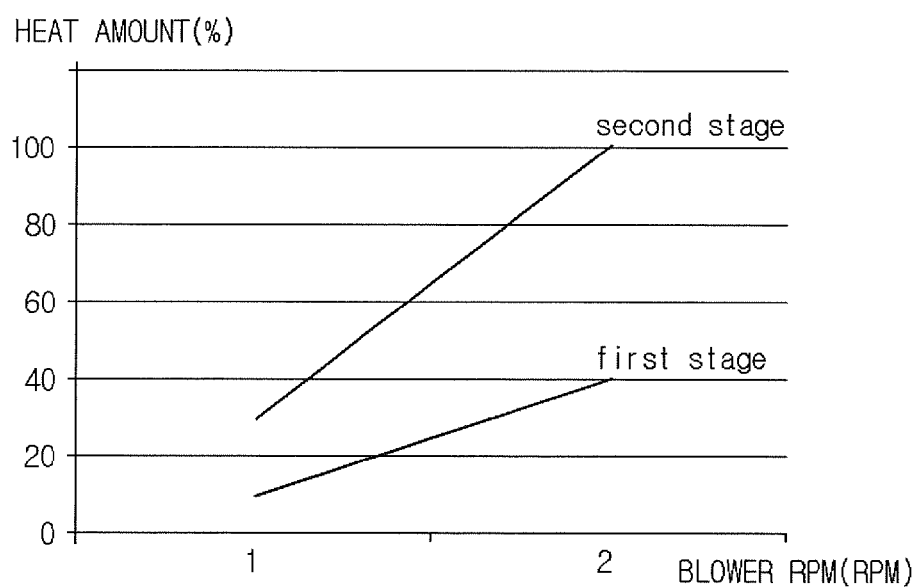
FIG. 13 is a graph showing correlation of heat amount according to variation of the load.

FIG. 13 is a graph showing correlation of heat amount according to variation of the load. When the set load is in a low power (first stage) state, only the first passage 210 is opened, and when the set load is in a high power (second stage) state, both of the first and second passages 210 and 220 are opened. Also, the mixed-gas of the air, the combustion gas, and the recirculated exhaust gas having a uniform air-fuel ratio may be supplied by controlling the RPM of the blower 140 to secure a preset heat amount.

As described above, according to the embodiments of the present invention, the premixing chamber 200 may have a venture structure partitioned into two stages, and the first passage 210 may be in an opened state all the time, and the second passage 220 may be opened only at the time of high power load according to a combustion load area, and also a portion of the exhaust gas may recirculate to supply the mixed-gas in which the air, the combustion gas, and the exhaust gas are mixed with each other. Thus, combustion system that is reduced in flame temperature to significantly reduce the emission amount of nitrogen oxide and improved in combustion efficiency by perfect combustion and stable over an entire load area from the high power load to the low power load may be realized.

Figure 14:
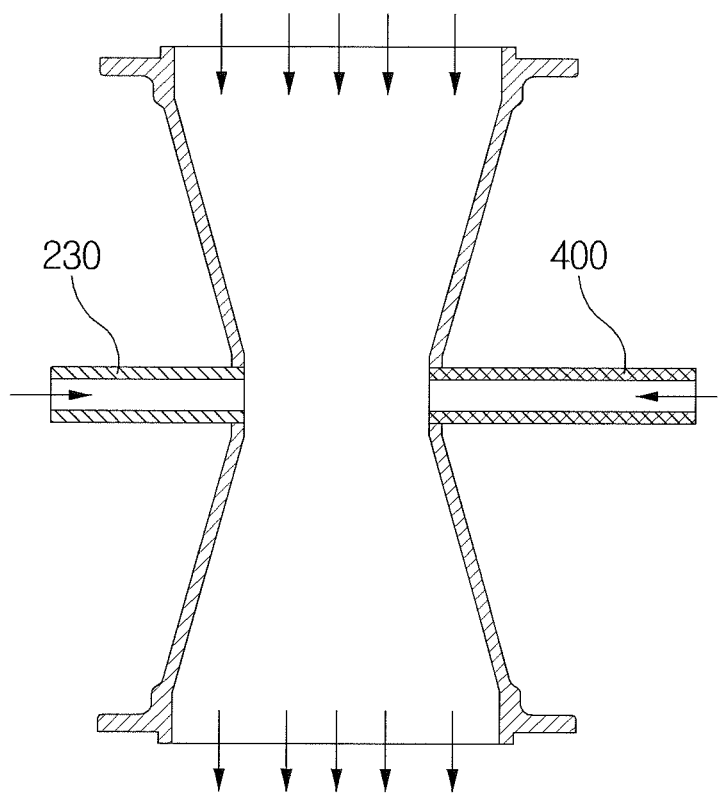
FIG. 14 is a cross-sectional view of a premixing chamber according to another embodiment of the present invention.

In the above-describe embodiments, although the premixing chamber 200 has a venturi structure that is partitioned into the two stages, which are the first passage 210 and the second passage 220, as illustrated in FIG. 14, the premixing chamber 200 according to the present invention may have a single passage venturi shape in which the gas supply part 230 and the exhaust gas recirculation tube 400 are connected to the throat part. In this case, the exhaust may recirculate in proportional to the differential pressure between the air and the gas passing through the throat part and then be introduced and mixed to supply the mixed-gas in which the air, the combustion gas, and the exhaust gas are mixed with each other at a uniform air-fuel ratio.

The invention claimed is:

1. A combustion apparatus comprising:
a premixing chamber in which air is mixed with a gas;
a blower for supplying the mixed-gas of the air and the gas to a burner;
a combustion chamber in which combustion is performed by ignition of the burner;
a heat exchanger in which water is heat-exchanged with combustion heat of the combustion chamber;
an exhaust gas discharge part from which an exhaust gas passing through the heat exchanger is discharged,
wherein the premixing chamber has a venturi shape having a throat part, which is gradually reduced in section area from an inlet and an outlet of the premixing chamber to a central portion thereof, between the inlet and the outlet through which the air passes, and
a gas supply part supplying a combustion gas and an exhaust gas recirculation tube are connected to the throat part of the premixing chamber so that a portion of the exhaust gas passing through the heat exchanger is introduced in proportion to a differential pressure according to a flow rate of the mixed-gas passing through the throat part,
a mixed-gas adjusting part opening and closing a flow passage of the air and the gas passing through the premixing chamber to adjust a supply flow rate of the mixed-gas.

2. The combustion apparatus of claim 1, wherein the premixing chamber is divided into two sides, a first passage and a second passage, by a partition member therebetween,
the combustion gas introduced through the gas supply part is supplied to a first gas supply hole connected to the first passage and a second gas supply hole connected to the second passage, and
the exhaust gas recirculation tube is constituted by a first exhaust gas recirculation tube connected to the throat part of the first passage and a second exhaust gas recirculation tube connected to the throat part of the second passage.

3. The combustion apparatus of claim 2, wherein a flow passage of the air and the gas of the first passage is in an opened state all the time, and
the mixed-gas adjusting part opens and closes a flow passage of the air passing through the second passage and a flow passage of the gas connected to the second passage through the second gas supply hole.

4. The combustion apparatus of claim 3, wherein the first and second gas supply holes pass through one side surface of the first passage,
a first gas supply passage extending from the first gas supply hole to the partition member across the first passage and a second gas supply passage passing through the partition member from the second gas supply hole across the first passage to communicate with the second passage are defined in the throat part of the first passage,
a first gas jet hole is defined in the first gas supply passage toward an outlet-side of the first passage, and
a second gas connection hole is defined in an end of the second gas supply passage passing through the partition member toward the second passage.

5. The combustion apparatus of claim 4, wherein the mixed-gas adjusting part comprises:
a first opening/closing member for opening and closing the flow passage of the air passing through the second passage;
a second opening/closing member for opening and closing the second gas connection hole, and
wherein the first and second opening/closing members may be lined to each other and simultaneously opened and closed.

6. The combustion apparatus of claim 5, wherein the first opening/closing member comprises:
a main body coupled to a rotation shaft of a driving part and transversally disposed on the throat part of the second passage;
blades coupled to an outer surface of the main body to face each other and have a size corresponding to that of an opened transversal section of the throat part of the second passage, and
wherein the second opening/closing member reciprocates in a transversal direction according to rotation of the first opening/closing member.

7. The combustion apparatus of claim 6, wherein, on the main body of the first opening/closing member, a first tip portion protruding toward the second opening/closing member and a first bottom portion having an oppositely recessed shape with respect to the first tip portion are alternately disposed at an angle of 90° along a circumferential direction,
a first inclined portion having a recessed shape is disposed between the first tip portion and the first bottom portion,
a second tip portion, a second bottom portion, and a second inclined portion each of which has a shape corresponding to that of each of the first tip portion, the first bottom portion, and the first inclined portion are disposed on the main body (331) of the second opening/closing member, and the second opening/closing member is elastically supported so that the second opening/closing member is pressed toward the first opening/closing member by an elastic member.

8. The combustion apparatus of claim 7, wherein a sealing member for maintaining air-tightness when the second gas connection hole is sealed is coupled to the second opening/closing member.

9. The combustion apparatus of claim 7, wherein, when the first tip portion of the first opening/closing member contacts the second tip portion of the second opening/closing member, the blades of the first opening/closing member are parallelly disposed with respect to a transversal section of the second passage to block the flow of the air of the second passage, and at the same time, the second opening/closing member is closely attached to the second gas connection hole to block the flow of the gas passing through the second gas connection hole, and when the first tip portion of the first opening/closing member contacts the second bottom portion of the second opening/closing member, and the first bottom portion of the first opening/closing member contacts the second tip portion of the second opening/closing member, the blades of the first opening/closing member are vertically disposed with respect to the transversal section of the second passage to open the second passage, and at the same time, the second opening/closing member is spaced apart from the second gas connection hole to open the second gas connection hole.

10. The combustion apparatus of claim 7, wherein a guide member accommodating the second opening/closing member and the elastic member therein to guide a reciprocating motion of the second opening/closing member is disposed on the throat part of the second passage, and a second gas jet hole is defined in the guide member toward an outlet-side of the second passage.

11. The combustion apparatus of claim 10, wherein protruding pieces for supporting one end of the elastic member are disposed in plurality on an edge of the main body of the second opening/closing member along a circumferential direction, and a flange part for supporting the other end of the elastic member and that is closely attached on a circumferential surface of the second gas connection hole is disposed in the guide member.

12. The combustion apparatus of claim 11, wherein a plurality of guide grooves for guiding the plurality of protruding pieces to move in a horizontal direction are defined in an inner surface of the guide member in longitudinal direction.

13. The combustion apparatus of claim 11, wherein fixing projections and fixing grooves that are fitted and coupled to each other are respectively formed on the flange part of the guide member and the circumferential surface of the second gas connection hole to fix the guide member.

14. A combustion apparatus comprising:

a premixing chamber in which air is mixed with a gas;

a blower for supplying the mixed-gas of the air and the gas to a burner;

a combustion chamber in which combustion is performed by ignition of the burner;

a heat exchanger in which water is heat-exchanged with combustion heat of the combustion chamber; and an exhaust gas discharge part from which an exhaust gas passing through the heat exchanger is discharged, wherein the premixing chamber has a venturi shape having a throat part, which is gradually reduced in section area from an inlet and an outlet of the premixing chamber to a central portion thereof, between the inlet and the outlet through which the air passes, and a gas supply part supplying a combustion gas and an exhaust gas recirculation tube are connected to the throat part of the premixing chamber so that a portion of the exhaust gas passing through the heat exchanger is introduced in proportion to a differential pressure according to a flow rate of the mixed-gas passing through the throat part, wherein the premixing chamber has a venturi shape having a single passage.

\* \* \* \* \*